United States Patent
Chang et al.

(10) Patent No.: US 7,272,645 B2
(45) Date of Patent: Sep. 18, 2007

(54) METHOD OF IMPROVING THE RELIABILITY OF PEER-TO-PEER NETWORK DOWNLOADS

(75) Inventors: Frederick Robert Chang, Austin, TX (US); Sreenivasa Rao Gorti, Austin, TX (US); Jennifer Lynne Joy, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 1190 days.

(21) Appl. No.: 09/866,502

(22) Filed: May 25, 2001

(65) Prior Publication Data
US 2002/0178261 A1 Nov. 28, 2002

(51) Int. Cl.
*G06F 15/173* (2006.01)
(52) U.S. Cl. ............... 709/223; 709/203; 709/225; 709/229; 709/233
(58) Field of Classification Search ........... 709/203, 709/213, 217, 219, 225, 226, 229, 223, 224, 709/233; 707/2, 9; 718/105; 714/4, 18; 717/168–178
See application file for complete search history.

(56) References Cited

U.S. PATENT DOCUMENTS

| | | | |
|---|---|---|---|
| 5,553,083 A * | 9/1996 | Miller .................. 714/748 |
| 5,740,423 A | 4/1998 | Logan et al. |
| 5,848,231 A | 12/1998 | Teitelbaum et al. ......... 395/186 |
| 5,913,028 A | 6/1999 | Wang et al. |
| 6,003,030 A | 12/1999 | Kenner et al. |
| 6,029,195 A | 2/2000 | Herz .................. 709/219 |
| 6,046,980 A | 4/2000 | Packer .................. 370/230 |
| 6,049,892 A * | 4/2000 | Casagrande et al. ......... 714/18 |
| 6,098,180 A * | 8/2000 | Kobata et al. .............. 714/18 |
| 6,108,703 A | 8/2000 | Leighton et al. |
| 6,195,680 B1 * | 2/2001 | Goldszmidt et al. ........ 709/203 |
| 6,216,163 B1 * | 4/2001 | Bharali et al. ............. 709/227 |
| 6,339,785 B1 * | 1/2002 | Feigenbaum ............... 709/213 |
| 6,381,709 B1 * | 4/2002 | Casagrande et al. ......... 714/18 |
| 6,606,643 B1 * | 8/2003 | Emens et al. ............. 709/203 |
| 6,606,646 B2 * | 8/2003 | Feigenbaum ............... 709/203 |
| 6,742,023 B1 * | 5/2004 | Fanning et al. ............ 709/219 |
| 6,983,326 B1 * | 1/2006 | Vigue et al. ............. 709/229 |
| 2002/0049760 A1 * | 4/2002 | Scott et al. .............. 707/10 |
| 2002/0052885 A1 * | 5/2002 | Levy .................... 707/200 |
| 2002/0073075 A1 * | 6/2002 | Dutta et al. .............. 707/3 |
| 2002/0073204 A1 * | 6/2002 | Dutta et al. .............. 709/227 |
| 2002/0138471 A1 * | 9/2002 | Dutta et al. .............. 707/3 |
| 2002/0138576 A1 * | 9/2002 | Schleicher et al. ......... 709/205 |
| 2002/0138744 A1 * | 9/2002 | Schleicher et al. ......... 713/187 |

OTHER PUBLICATIONS

International Search Report received from the International Searching Authority, dated Jul. 31, 2002 for PCT/US02/16028, 1 page.

* cited by examiner

*Primary Examiner*—Ario Etienne
*Assistant Examiner*—LaShonda Jacobs
(74) *Attorney, Agent, or Firm*—Hanley, Flight & Zimmerman, LLC

(57) ABSTRACT

A method of improving the reliability of peer-to-peer network downloads includes the steps of initiating a search from a client on a peer-to-peer network (152). Next, a list of servers is downloaded that satisfies the search (154). At least one of the servers is selected from the list of servers (156). Next, one of a plurality of downloading systems is selected based on a predetermined criteria (158). A file is downloaded using one of the plurality of downloading systems.

27 Claims, 9 Drawing Sheets

_100_

| /102 | /104 | /106 | /108 | /110 | /112 |
|---|---|---|---|---|---|
| Server | File Name | File Size | Encoding | Source Node | Bandwidth |
| Server 1 | ABC | 1.2M | 32K PCM | N/A | 28K |
| Server 2 | EFG | 600K | 16K PCM | N/A | 56K |
| ⋮ | | | | | |
| Server N | XYZ | 1.2M | 32K PCM | Server 1 | 128K |

FIG. 6

| /102 | /104 | /106 | /108 | /110 | /112 |
|---|---|---|---|---|---|
| Server | File Name | File Size | Encoding | Source Node | Bandwidth |
| Server 1 | ABC | 600K | 16K PCM | N/A | 256K |
| Server 2 | EFG | 600K | 16K PCM | Server N | 128K |
| ⋮ | | | | | |
| Server N | XYZ | 600K | 16K PCM | Server 1 | 28K |

FIG. 7

METHOD OF IMPROVING THE RELIABILITY OF PEER-TO-PEER NETWORK DOWNLOADS

FIELD OF THE INVENTION

The present invention relates to peer-to-peer networks and more particularly to a method of improving the reliability of peer-to-peer network downloads.

BACKGROUND OF THE INVENTION

In a peer-to-peer network a computer connected to the network acts as both a server and a client. In one example a person may store JPEG (Joint Photographic Experts Group) photograph files on his computer. Other computers on the network can see the JPEG photograph files on his computer and request that they be downloaded to their computer. On the other hand this person can see the JPEG photograph on other network user's computers and may request that one of the files be downloaded to his computer. This makes peer-to-peer networks very versatile. One problem that occurs with peer-to-peer networks is that errors can occur during a download. The user then has to start the downloading process over. Since the "server" is not a dedicated server, this problem is even more likely to occur. Some of the sources of errors (failures) are: power down by a user during a download; server IP (Internet Protocol) address is dynamically re-assigned by the ISP (Internet Service Provider); and the server is not able to handle the load of requests. Note that this list is not meant to be exclusive, just representative.

Thus there exists a need for a method of downloading files on a peer-to-peer network that increases the reliability and efficiency of the downloading process.

BRIEF DESCRIPTION OF THE DRAWINGS

FIG. 6 is an example of a list of servers that satisfy a search query in accordance with one embodiment of the invention;

FIG. 7 is an example of a list of servers that satisfy a search query in accordance with one embodiment of the invention;

DETAILED DESCRIPTION OF THE DRAWINGS

A method of improving the reliability of peer-to-peer network downloads includes the steps of initiating a search from a client on a peer-to-peer network. Next, a list of servers is downloaded that satisfies the search. At least one of the servers is selected from the list of servers. Next, one of a plurality of downloading systems is selected based on a predetermined criteria. A file is downloaded using one of the plurality of downloading systems. One of the downloading systems is a multiple concurrent download system. Using this system the client downloads two or more identical versions of the file simultaneously. As a result, a failure on one of the servers does not result in the file not being downloaded. Generally this download system is only used if the bandwidth connection of the client is at least two times the potential download speed of the server.

Figure 1:
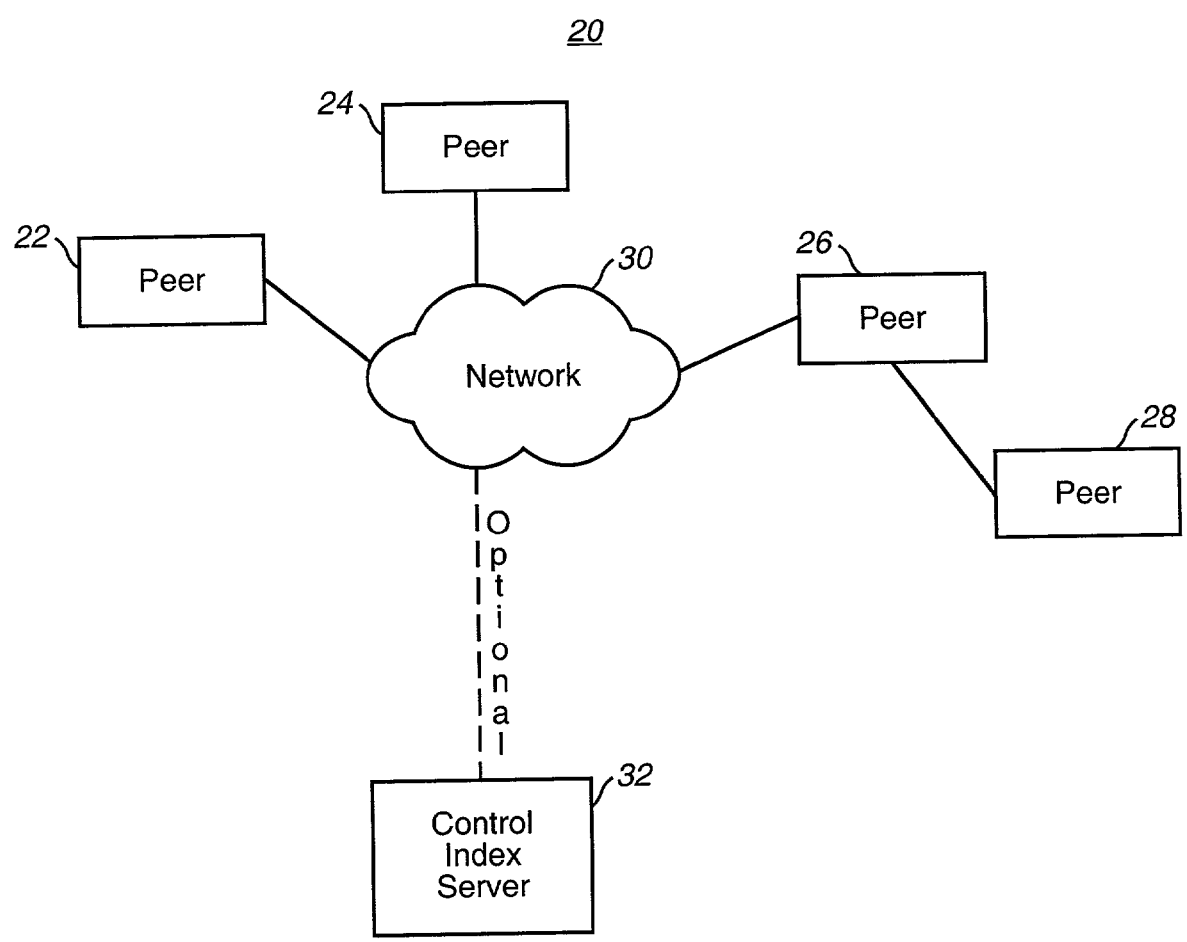
FIG. 1 is a block diagram of peer-to-peer network in accordance with one embodiment of the invention.

FIG. 1 is a block diagram of peer-to-peer network 20 in accordance with one embodiment of the invention. The peer-to-peer network 20 has a plurality of peers (computers) 22, 24, 26, 28 connected together by a network 30. Note that two peers 26, 28 may be directly connected to each other. In one embodiment, the peer-to-peer network may contain a central index server 32. If the network 20 contains a central index server, the server 32 indexes the files (programs) that are available to members of the network 20 and handles queries for those files. In one embodiment, the queries may be text queries. In another embodiment, the queries are a unique key. In the unique key embodiment, a hashing code is used to determine the unique key for each file. The indexing method is separate from whether the peer-to-peer network has a central index server or uses a broadcast query method.

Figure 2:
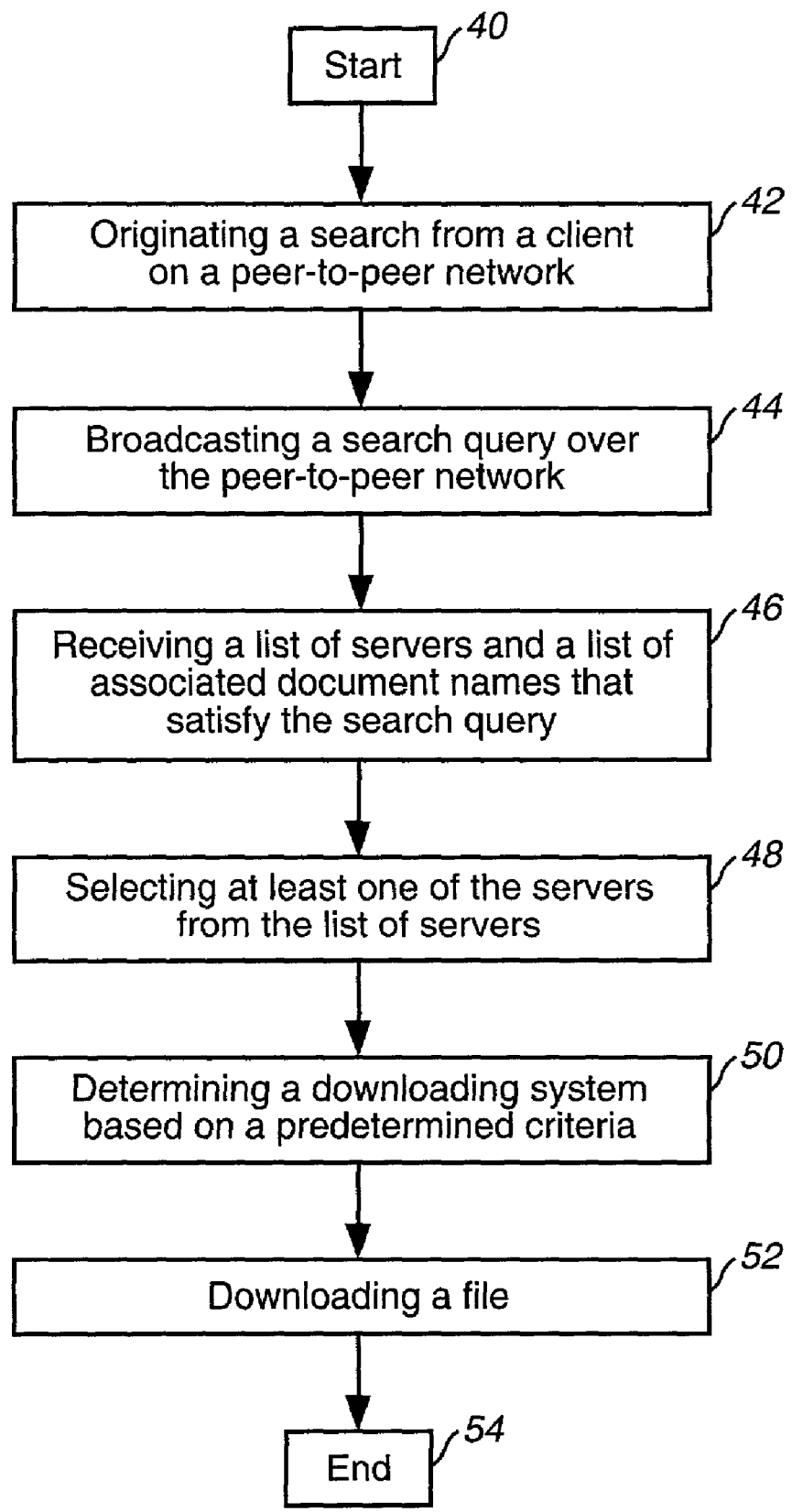
FIG. 2 is a flow chart of the steps used in a method of improving the reliability of peer-to-peer network downloads in accordance with one embodiment of the invention.

FIG. 2 is a flow chart of the steps used in a method of improving the reliability of peer-to-peer network downloads in accordance with one embodiment of the invention. The process starts, step 40, by originating a search from a client on a peer-to-peer network at step 42. A search query is broadcast over the peer-to-peer network at step 44. A list of servers and a list of associated document names that satisfy the search query is received at the client at step 46. At least one of the servers is selected from the list of servers at step 48. At step 50, a downloading system is determined based on a predetermined criteria. At step 52, a file is downloaded which ends the process at step 54. Note that once a user selects the correct file for downloading, the system may select exact copies of that file for downloading. In another embodiment, the downloading system may select files having the same content but a different compression level for downloading.

In one embodiment, a unique key that identifies the file is entered as the search query. In another embodiment, the user may also receive the file size, a source node and unique key with the list of servers.

In one embodiment, the system measures a connection speed to the plurality of servers. The connection speed of the plurality of servers is compared to an available bandwidth at the client. This information is used to determine which download system is used. Next it is determined if an available bandwidth is less than a connection speed to two of the servers. When the available bandwidth is less than the connection speed to two of the servers, a serial concatenated download system is selected. A serial concatenated download system selects a first server (one of the list of servers) to start a download. If there is a failure at the first server, a second server is selected. The download is requested to start at a next byte after a last byte received. When the available bandwidth is not less than the connection speed to two of the servers, a multiple concurrent download system is selected. This system starts downloading from multiple servers (at least two servers) at the same time. In another embodiment a multiple concatenated download system is selected when the available bandwidth is not less than the connection speed to two of the servers. The multiple concatenated download system starts a first download at a first byte of the file for one of the at least two servers. Then a second download is started at a second byte of the file for a second of the at least two servers. The files are combined to create a complete file. As will be apparent to those skilled in the art the system can be expanded to n-servers.

Figure 3:
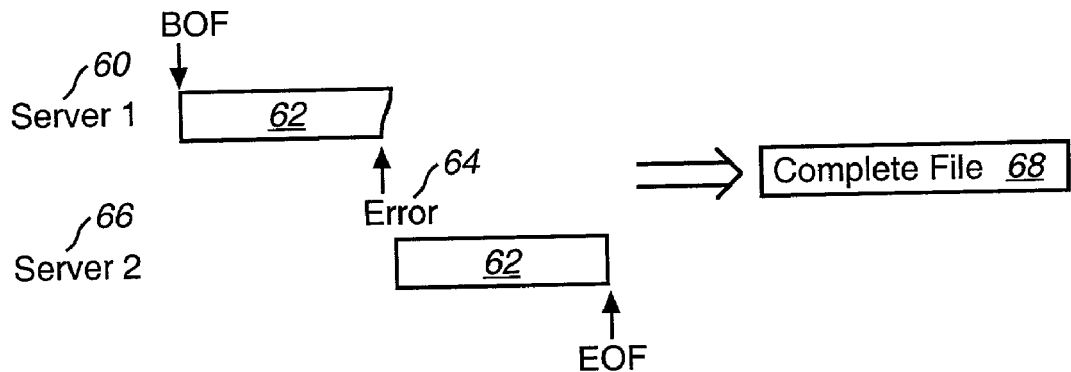
FIG. 3 is a schematic diagram of a downloading system in accordance with one embodiment of the invention.

FIG. 3 is a schematic diagram of a downloading system in accordance with one embodiment of the invention. This figure shows an example of a serial concatenated download system. A first server 60 starts downloading a file 62 to the client from the beginning of the file (BOF). When an error 64 occurs, a second server 66 begins downloading the exact same file to the client at the point the error occurred. This reduces the time to download the file since only the parts of the file not received are downloaded. The two (or more) parts of the file are then concatenated to form the complete file 68. Note that the system may be expanded to include n-servers, as will be apparent to those skilled in the art.

Figure 4:
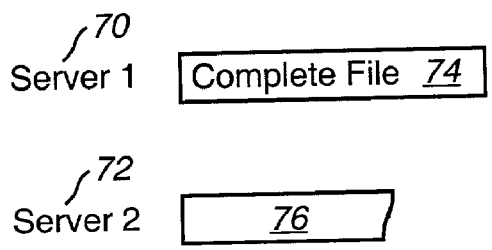
FIG. 4 is a schematic diagram of a downloading system in accordance with one embodiment of the invention.

FIG. 4 is a schematic diagram of a downloading system in accordance with one embodiment of the invention. This figure shows a multiple concurrent download system. A first server 70 and a second server 72 concurrently start to download the file 74, 76 to the client. If an error occurs with one of the servers the other server continues to download the file to the client. This increases the reliability of the download. If one servers completes the download first the other download is canceled. This can be accomplished by having two processes running on the client machine that send a message to each other when one of them has finished downloading the file or this can be done with two threads of the same process. Note that this system can be expanded to n-servers as will be apparent to those skilled in the art.

Figure 5:
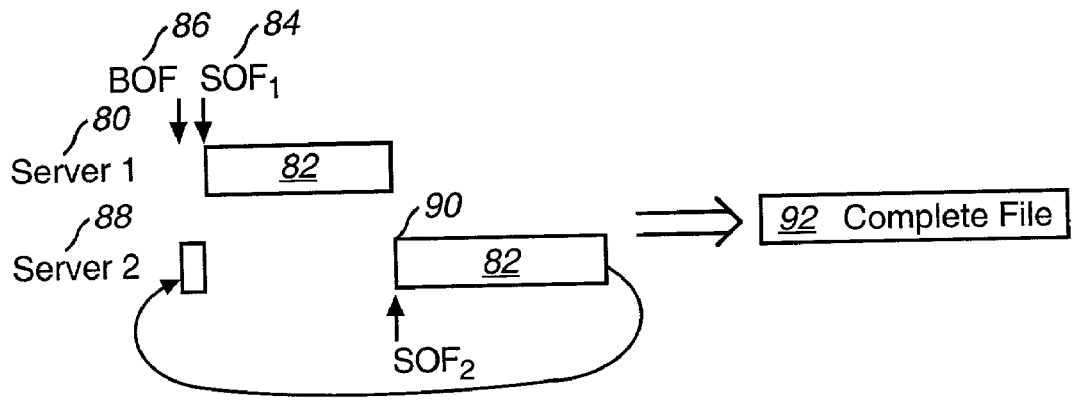
FIG. 5 is a schematic diagram of a downloading system in accordance with one embodiment of the invention.

FIG. 5 is a schematic diagram of a downloading system in accordance with one embodiment of the invention. This figure shows a multiple concatenated download system. A first server 80 starts downloading a file 82 at a first start byte 84 to the client. Note that the start of file 84 need not be the beginning of the file 86. A second server 88 starts downloading the file 82 at a second start byte 90 to the client. When various portions of the file can be combined to from a complete copy of the file, the download is terminated and the portions are concatenated to form the complete file 92. This can be accomplished by having two processes running on the client machine that send a message to each other when an overlapping byte is downloaded or this can be done with two threads of the same process. Note that this technique can also be expanded to n-servers.

FIG. 6 is an example of a list of servers 100 that satisfy a search query in accordance with one embodiment of the invention. The figure shows an example of the information a user might receive in response to a text query. The user would receive a list of servers 102, an associated file name (file path) 104, a file size 106 for each of the files. Note that the file sizes 106 vary by the encoding scheme used 108. A source node 110 may also be provided for the file. A source node 110 is the server (file) from which the file was copied. Finally a bandwidth (download speed) 112 is included that shows how fast a file can be downloaded from the server.

FIG. 7 is an example of a list of servers that satisfy a search query in accordance with one embodiment of the invention. FIG. 7 is similar to FIG. 6 except that the search was based on a unique key (hashing code). In this case the file sizes 106 and encoding schemes 108 are exactly the same for all the servers. This is because the hashing code that determines the unique key is derived from the complete file. As a result a file encoded with two different encoding systems will have two different unique keys.

Figure 8:
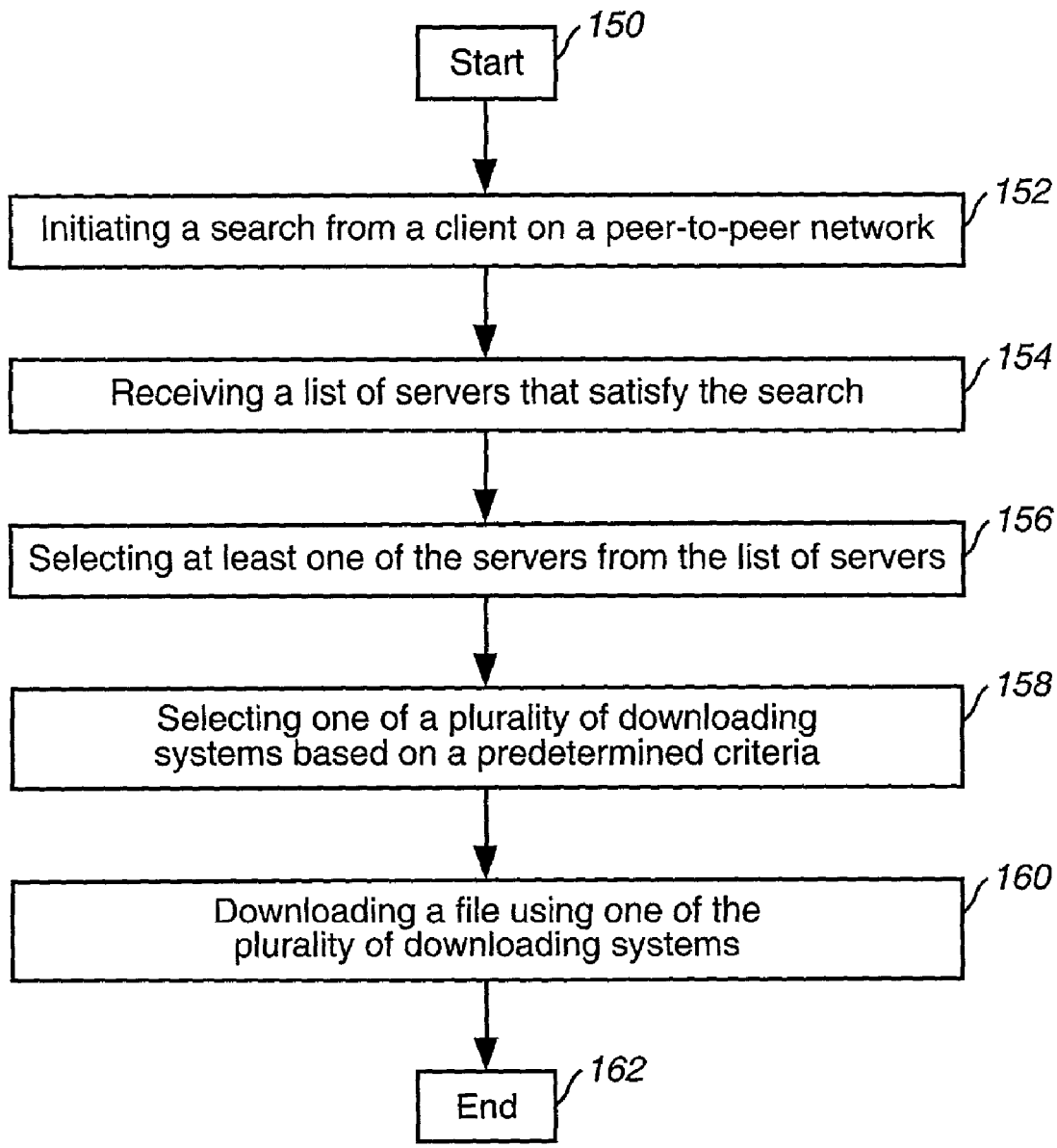
FIG. 8 is a flow chart of the steps used in a method of improving the reliability of peer-to-peer network downloads in accordance with one embodiment of the invention.

FIG. 8 is a flow chart of the steps used in a method of improving the reliability of peer-to-peer network downloads in accordance with one embodiment of the invention. The process starts, step 150, by initiating a search from a client on a peer-to-peer network at step 152. A list of servers that satisfy the search is received at the client at step 154. At least one of the servers from the list of servers is selected at step 156. In one embodiment, a user selects the server. In another embodiment, the client selects one of the files based on a file size, encoding scheme, download speed or other criteria. One of the plurality of downloading systems is selected based on a predetermined criteria at step 158. At step 160 a file is downloaded using one of the plurality of downloading system which ends the process at step 162.

In one embodiment the step of selecting a download system includes the choice of: a multiple concurrent download system; a multiple concatenated download system; or a serial concatenated download system. One of the predetermined criteria for selecting between the downloading systems is a connection speed to one of the servers. In one embodiment, the connection speed is compared to an available bandwidth at the client.

In one embodiment, initiating the search includes entering a text string. In another embodiment, initiating the search includes entering a unique key. The search may be broadcast to the peer-to-peer network. In another embodiment, the search query is transmitted to a central server. The response to the query may include a document name, a file size, an available bandwidth at a server and a source node for the file.

Figure 9:
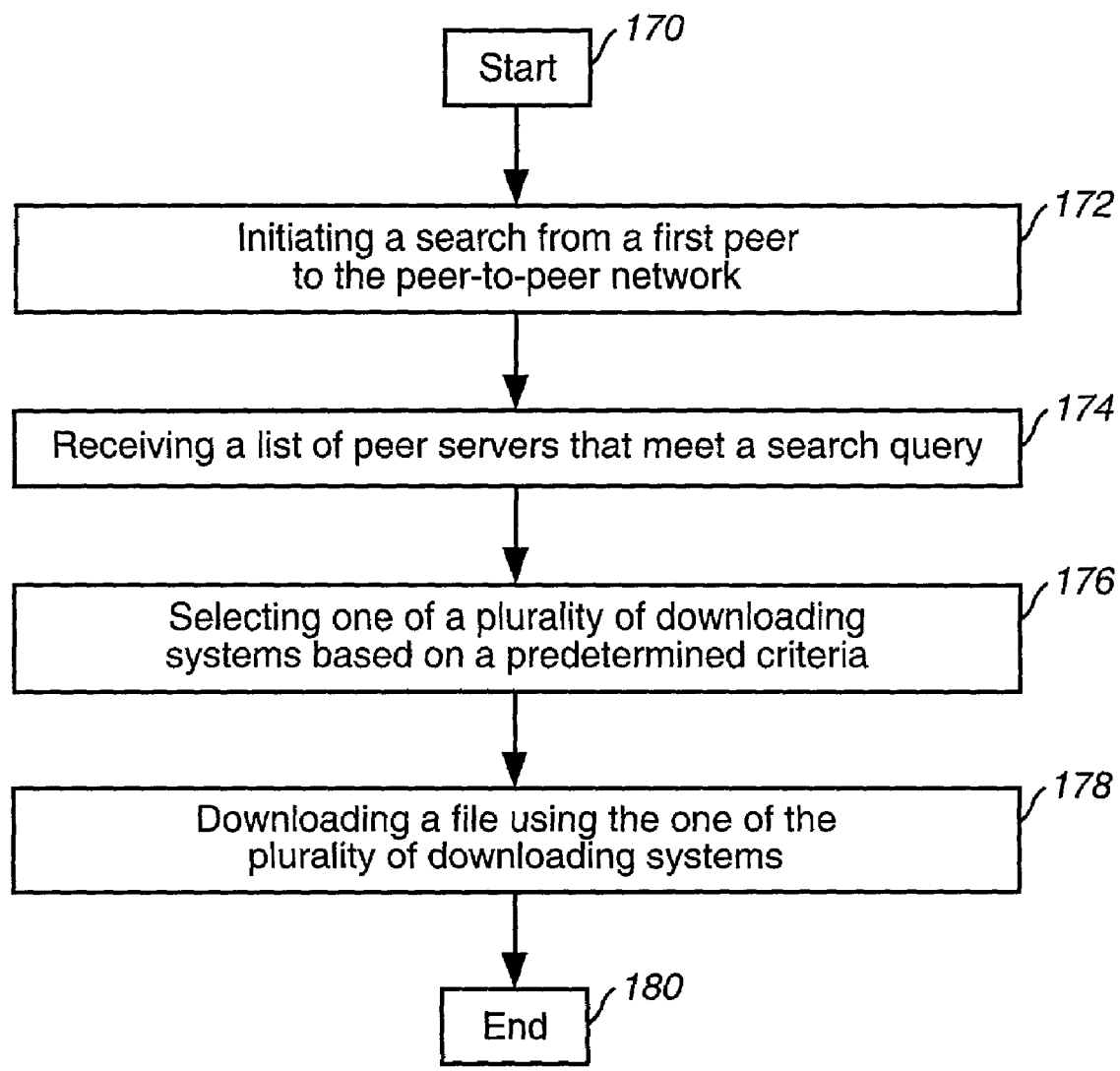
FIG. 9 is a flow chart of the steps used in a method of improving the reliability of peer-to-peer network downloads in accordance with one embodiment of the invention.

FIG. 9 is a flow chart of the steps used in a method of improving the reliability of peer-to-peer network downloads in accordance with one embodiment of the invention. The process starts, step 170, by initiating a search from a first peer to the peer-to-peer network at step 172. A list of peer servers that meet a search query is received at step 174. One of the plurality of downloading systems is selected based on a predetermined criteria at step 176. At step 178 a file is downloaded using the one of the plurality of downloading system which ends the process at step 180. In one embodiment, the predetermined criteria includes determining a connection speed to each of the peer server on the list of peer servers. A subset of the list of peer servers is selected based on the connection speed. One method of determining the connection speed is to receive a test file from each of the peer servers. Another method of determining the connection speed is to determine an order of response from each of the servers. Yet another method of determining connection speed is to ping each of the servers.

When an available bandwidth at the client is less than two times a connection speed, a server is selected with the fastest connection speed. The download is started from the server with the fastest connection speed. If the server with the fastest connection speed has an error before the file is downloaded, a second server is selected. A last byte received is determined. A download starting from a next byte command is transmitted to a second server.

When an available bandwidth at the client is not less than two times a connection speed, a plurality of servers is selected from the list of servers. A plurality of simultaneous downloads is started from the plurality of servers. If the client has received a complete version of the file from one of the plurality of servers, the rest of the downloads are terminated. In another embodiment, a plurality of simultaneous offset downloads is started from the plurality of servers. When a complete file can be formed from the plurality of simultaneous offset downloads, the complete file is constructed.

Figure 10A:
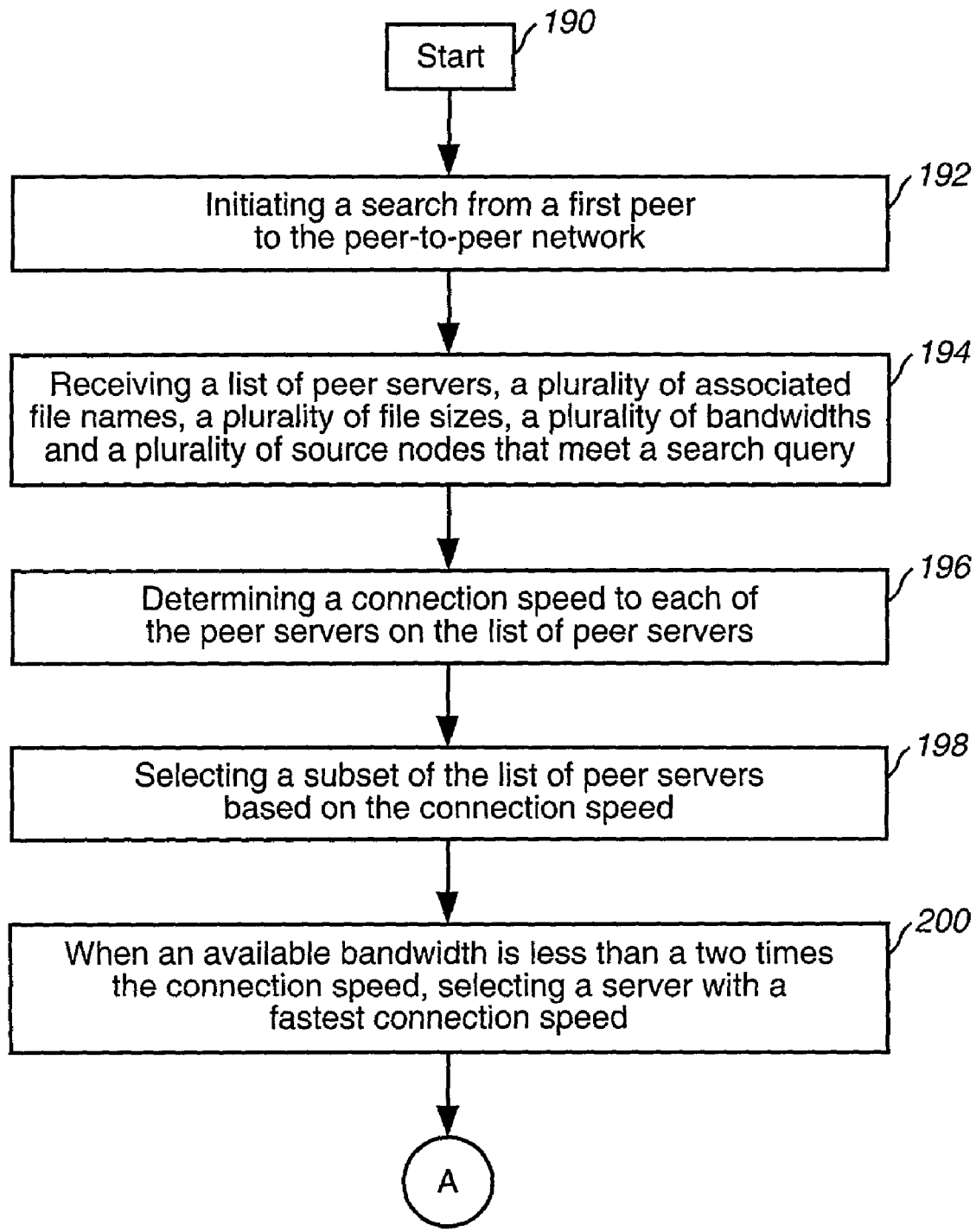
FIGS. 10a-c are a flow chart of the steps used in a method of improving the reliability of peer-to -peer network downloads in accordance with one embodiment of the invention.
Figure 10B:
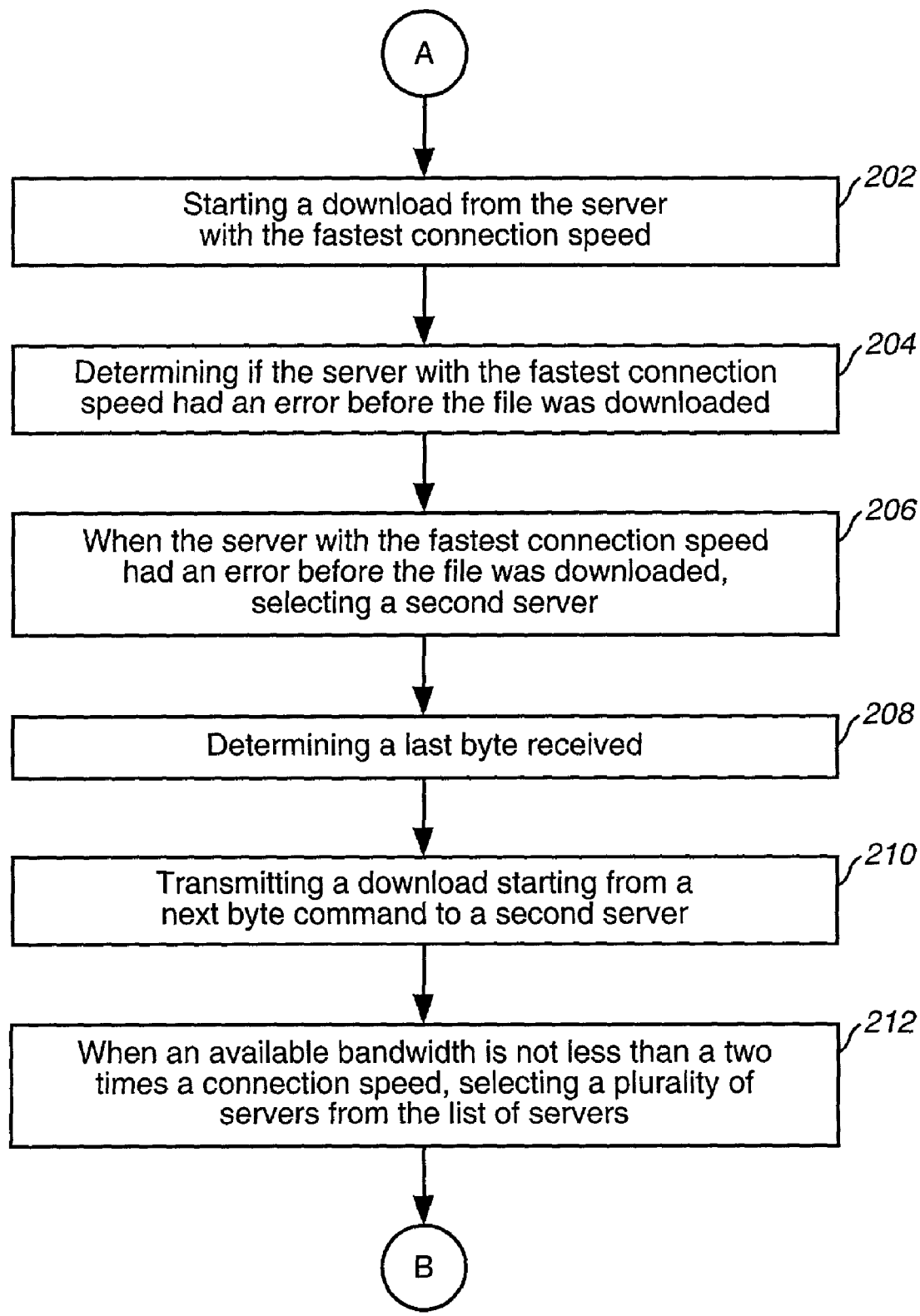
Figure 10C:
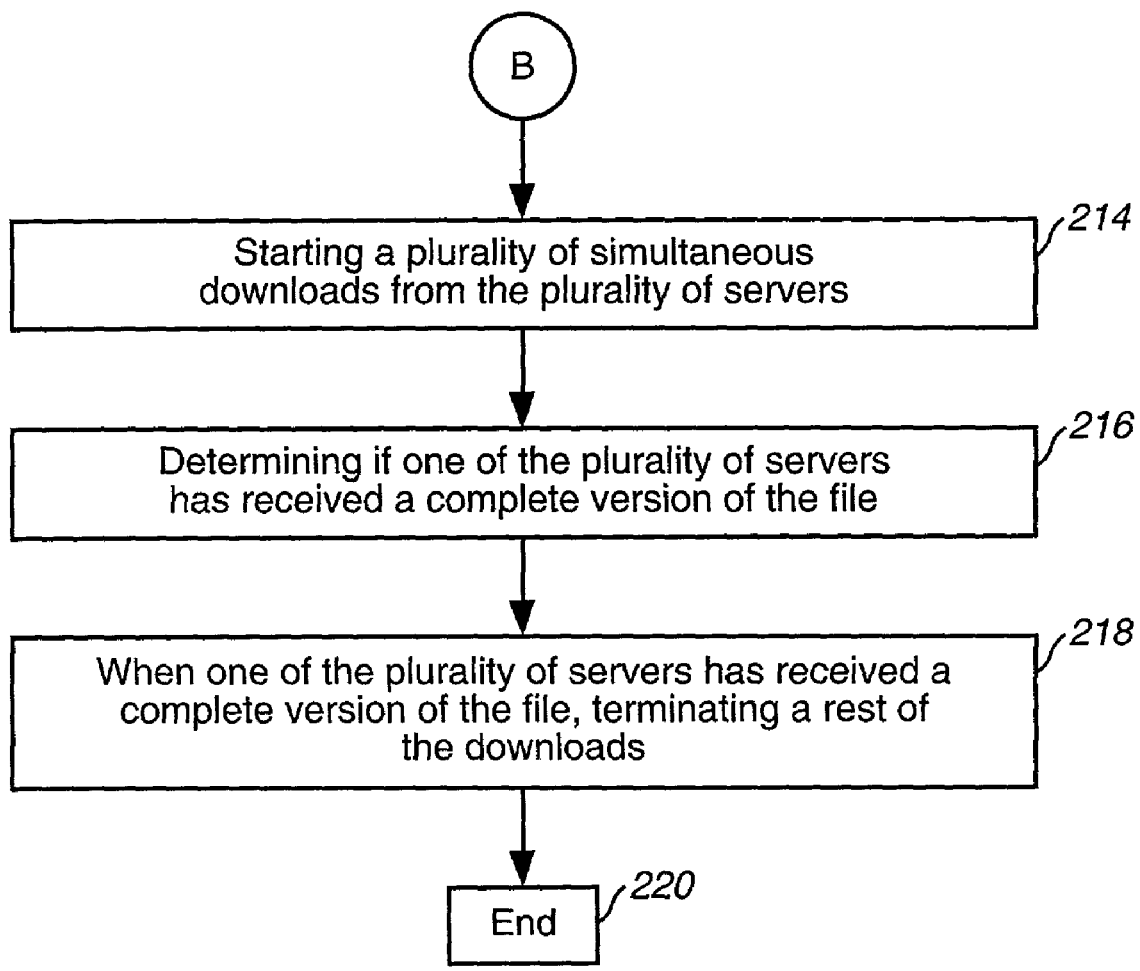

FIGS. 10a-c are a flow chart of the steps used in a method of improving the reliability of peer-to-peer network downloads in accordance with one embodiment of the invention. The process starts, step 190, by initiation a search form a first peer to the peer-to-peer network at step 192. A list of peer servers, a plurality of associated file names, a plurality of file sizes, a plurality of bandwidths and a plurality of source nodes that meet a search query are received at step 194. A connection speed to each of the peer servers on the list of peer servers is determined at step 196. A subset of the list of peer servers is selected based on the connection speed at step 198. When an available bandwidth is less than two times the connection speed, a server with a fastest connection speed is selected at step 200. A download is started from the server with the fastest connection speed at step 202. Next it is determined if the server with the fastest connection speed had an error before the file was download at step 204. When the server with the fastest connection speed had an error before the file was downloaded, a second server is selected at step 206. A last byte that was received is determined at step 208. A download starting from a next byte command is transmitted to a second server at step 210. When an available bandwidth is not less than two times a connection speed, a plurality of servers are selected from the list of servers at step 212. A plurality of simultaneous downloads is started from the plurality of servers at step 214. Next it is determined if one of the plurality of servers has received a complete version of the file at step 216. When one of the plurality of servers has received a complete version of the file at step 218, the rest of the downloads are terminate which ends the process at step 220.

Thus there has been described a technique that increases the reliability, ease and efficiency of downloading files over a peer-to-peer network. The method is flexible and adapts for the best solution depending on available bandwidth, connection speeds, etc.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of managing of peer-to-peer network downloads, comprising:
    initiating a broadcast search from a client on a peer-to-peer network;
    receiving a list of servers that satisfy the search;
    comparing a connection speed of at least one of the servers to an available network access bandwidth of the client;
    selecting one of a plurality of downloading systems based on the comparison;
    determining if an available bandwidth is less than a connection speed to two of the servers;
    when the available bandwidth is less than the connection speed to two of the servers, selecting a serial concatenated download system;
    when the available bandwidth is not less than the connection speed to two of the servers, selecting a multiple concurrent download system;
    when the available bandwidth is not less than the connection speed to two of the servers, selecting a multiple concatenated download system; and
    downloading a file using one of the plurality of downloading systems.

2. The method of claim 1, further comprising:
    determining the connection speed of the at least one of the servers.

3. The method of claim 1, wherein initiating the broadcast search from the client on the peer-to-peer network further comprises:
    entering a text string.

4. The method of claim 1, wherein initiating the broadcast search from the client on the peer-to-peer network further comprises:
    entering a unique key.

5. The method of claim 1, wherein receiving the list of servers further comprises:
    receiving a document name.

6. The method of claim 1, wherein receiving the list of servers further comprises:
    receiving a file size.

7. The method of claim 1, wherein receiving the list of servers further comprises:
    receiving a source node for the file.
    downloading a file using one of the plurality of downloading systems.

8. The method of claim 1, wherein receiving the list of servers further comprises:
    receiving an available bandwidth at least one of the servers.

9. A method of managing peer-to-peer network downloads, comprising:
    broadcasting a search query from a client over the peer-to-peer network;
    receiving a list of servers and a list of associated document names that satisfy the search query;
    comparing a connection speed of at least one of the servers on the list of servers to an available network access bandwidth of the client;
    determining one of a plurality of downloading systems based on the comparison;
    determining if an available bandwidth is less than a connection speed to two of the servers;
    when the available bandwidth is less than the connection speed to two of the servers, selecting a serial concatenated download system;
    when the available bandwidth is not less than the connection speed to two of the servers, selecting a multiple concurrent download system;
    when the available bandwidth is not less than the connection speed to two of the servers, selecting a multiple concatenated download system; and
    downloading a file via the one of the plurality of downloading systems.

10. The method of claim 9, wherein further comprising:
    entering a unique key that identifies the file.

11. The method of claim 9, wherein receiving the list of servers further comprises:
    receiving a file size, a source node and a unique key.

12. The method of claim 9, further comprising: measuring the connection speed to the at least one of the servers on the list of servers.

13. The method of claim 9, wherein selecting the serial concatenated download system further comprises:
   starting a download from one of the list of servers; and if the one of the list of servers is interrupted during the download, selecting a second of the list of server to start a download; iii) requesting the download to start at a next byte after a last received byte.

14. The method of claim 13, wherein selecting the multiple concurrent download system further comprises:
   starting a download from at least two of the servers; and if any of the at least two of the servers finishes the download, terminating the download for any other servers.

15. The method of claim 13, wherein selecting the multiple concatenated download system further comprises:
   starting a first download at a first byte of the file for one of the at least two servers;
   starting a second download at a second byte of the file for a second of the at least two servers; and
   determining when a complete file has been downloaded by combining the first download and the second download.

16. A method of operating a peer-to-peer network comprising the steps of:
   initiating a broadcast search from a first peer to the peer-to-peer network;
   receiving a list of peer servers that meet a search query;
   comparing a connection speed to at least one of the peer servers to an available network access bandwidth of the first peer;
   selecting one of a plurality of downloading systems based on the comparison;
   determining if an available bandwidth is less than a connection speed to two of the servers;
   when the available bandwidth is less than the connection speed to two of the servers, selecting a serial concatenated download system;
   when the available bandwidth is not less than the connection speed to two of the servers, selecting a multiple concurrent download system;
   when the available bandwidth is not less than the connection speed to two of the servers, selecting a multiple concatenated download system: and
   downloading a file using the selected one of the plurality of downloading systems.

17. The method of claim 16, wherein selecting one of the plurality of downloading systems further comprises:
   determining the connection speed to each of the peer servers on the list of peer servers;
   selecting a subset of the list of peer servers based on the determined connection speeds.

18. The method of claim 17, wherein determining the connection speed to each of the peer servers on the list of peer servers further comprises:
   requesting and receiving a test file from each of the servers on the list of servers.

19. The method of claim 17, wherein determining the connection speed to each of the peer servers on the list of peer servers further comprises:
   determining an order of response from each of the servers on the list of servers.

20. The method of claim 17, wherein determining the connection speed to each of the peer servers on the list of peer servers further comprises:
   pinging each of the servers on the list of servers.

21. The method of claim 16, wherein downloading the file using the one of the plurality of downloading systems further comprises:
   when the available bandwidth is less than two times the connection speed to at least one of the peer servers, selecting a server with a fastest connection speed; and
   starting a download from the server with the fastest connection speed.

22. The method of claim 21, further comprising:
   determining if the server with the fastest connection speed had an error before the file download was completed;
   when the server with the fastest connection speed had an error before the file download was completed, selecting a second server;
   determining a last byte received;
   transmitting a download starting from a next byte command to a second server.

23. The method of claim 16, wherein downloading the file using the selected one of the downloading systems further comprises:
   when an available bandwidth is not less than two times the connection speed to at least one of the peer servers, selecting a plurality of servers from the list of servers;
   starting a plurality of simultaneous downloads from the plurality of servers.

24. The method of claim 23, further comprising:
   determining if the client has received a complete version of the file from one of the plurality of servers;
   when the client has received a complete version of the file from one of the plurality of servers, terminating remaining downloads.

25. The method of claim 16, wherein downloading the file using the one of the plurality of downloading systems further comprises:
   when an available bandwidth is not less than two times the connection speed to at least one of the peer servers, selecting a plurality of servers from the list of servers;
   starting a plurality of simultaneous offset downloads from the plurality of servers.

26. The method of claim 25, further comprising:
   when a complete file can be formed from the plurality of simultaneous offset downloads, constructing a complete file.

27. A method of operating a peer-to-peer network comprising:
   initiating a search from a first peer to the peer-to-peer network;
   receiving a list of peer servers, a plurality of associated file names, a plurality of file sizes, a plurality of bandwidths and a plurality of source nodes that meet a search query;
   determining a connection speed to each of the peer servers on the list of peer servers;
   selecting a subset of the list of peer servers based on the connection speed;
   when an available bandwidth is less than two times a connection speed:
      selecting a server with a fastest connection speed;
      starting a download from the server with the fastest connection speed;
      determining if the server with the fastest connection speed had an error before the file was downloaded;
   when the server with the fastest connection speed had an error before the file was downloaded:
      selecting a second server;
      determining a last byte received;
      transmitting a download starting from a next byte command to a second server;
   when an available bandwidth is not less than two times a connection speed:
      selecting a plurality of servers from the list of servers;

starting a plurality of simultaneous downloads from the plurality of servers;

determining if the client has received a complete version of the file from one of the plurality of servers; and when the client has received a complete version of the file from one of the plurality of servers, terminating a rest of the downloads.

* * * * *